United States Patent [19]

Stingle et al.

[11] Patent Number: 4,862,024

[45] Date of Patent: Aug. 29, 1989

[54] HEAT DISSIPATION IN AN ELECTRIC MOTOR

[75] Inventors: Frederick W. Stingle, Simsbury, Conn.; Samuel Schmidt, Windsor, Conn.

[73] Assignee: United Technologies Corp., Hartford, Conn.

[21] Appl. No.: 132,737

[22] Filed: Dec. 14, 1987

[51] Int. Cl.$^4$ .............................................. H02K 9/00
[52] U.S. Cl. ...................................... 310/64; 310/156; 310/215; 165/47
[58] Field of Search ................... 310/57, 60 R, 54, 64, 310/65, 45, 46, 86, 215, 156, 171, 254, 177; 165/47

[56] References Cited

U.S. PATENT DOCUMENTS

| | | | |
|---|---|---|---|
| 3,013,500 | 12/1961 | Bollibon | 310/86 |
| 4,486,506 | 12/1984 | Kenjo | 310/45 |
| 4,486,677 | 12/1984 | Yamamoto | 310/64 |
| 4,691,132 | 9/1987 | Bertram | 310/156 |
| 4,692,646 | 9/1987 | Gotou | 310/156 |
| 4,709,752 | 12/1987 | Schroder | 165/47 |

FOREIGN PATENT DOCUMENTS

| | | | |
|---|---|---|---|
| 3042528 | 6/1982 | Fed. Rep. of Germany | 310/57 |
| 0141768 | 5/1980 | German Democratic Rep. | 310/64 |
| 0200696 | 6/1983 | German Democratic Rep. | 165/47 A |
| 0150746 | 11/1980 | Japan | 310/215 |
| 0141741 | 11/1981 | Japan | 310/64 |
| 0815842 | 3/1981 | U.S.S.R. | 310/64 |

*Primary Examiner*—R. Skudy

[57] ABSTRACT

A fusible, thermally conductive material (50) within which coils (40) of electric motor (10) are packed, cools the coils by melting and rejecting the heat of fusion thereof to the motor's stator core (20).

7 Claims, 1 Drawing Sheet

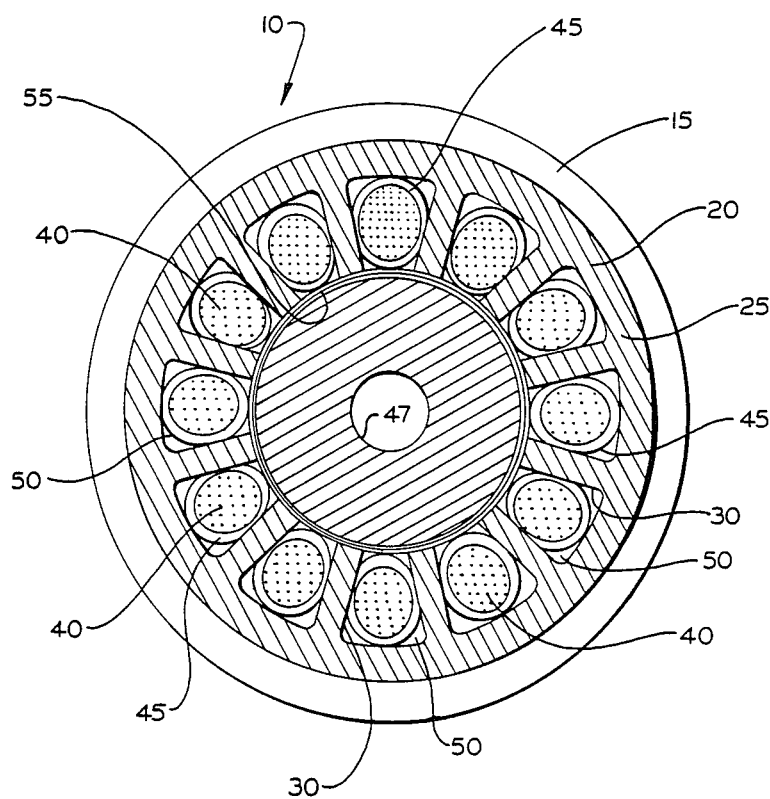

HEAT DISSIPATION IN AN ELECTRIC MOTOR

TECHNICAL FIELD

This invention relates generally to electromechanical actuators and specifically to heat dissipation in an electric motor.

BACKGROUND ART

State-of-the-art brushless d.c. motors may utilize rare earth, permanent magnets in the rotors thereof because of the inherent resistance of such magnets to demagnetization by the electromagnetic fields resulting from the motor's energization. Accordingly, these motors are capable of achieving high output torques with increased field energization, yet with relatively low attendant risk of rotor demagnetization. Moreover, rare earth magnets render such motors more compact, lighter, and more efficient than prior art motors employing conventional permanent magnets. However, because of the relatively high intensity magnetic fields associated with rare earth permanent magnet motors, the output of such motors is often limited by the temperature rise in the stator coils due to the high electrical energization thereof.

The electromechnical actuation system for a cruise missile fin is an example of an application for which permanent magnet brushless d.c. motors are well-suited. When the missile is fired, high motor torque is required for initial fin deployment. As the missile cruises, a low energy input to the motor is sufficient to maintain the fin in position. However, as the missile approaches a target and adjustment of fin position is required for final aiming, high motor torque output is required to hold the fin steady against aerodynamic forces. Such high torque outputs are, of course, only achieved with a high electrical input to the motor, thereby significantly raising the temperature of the stator coils. Since the motor operates in an extremely close environment and at relatively low speeds, cooling of the motor by forced ventilation techniques is generally unfeasible. Furthermore, since the coils, and in particular, the ends thereof, are usually spaced from the stator core by an air gap, coil cooling by thermal conduction to the stator core is generally ineffective. Accordingly, improved methods for cooling brushless d.c. motors are currently sought.

DISCLOSURE OF INVENTION

In accordance with the present invention, the stator coils of a motor such as the brushless d.c. motor described hereinabove, are cooled by the rejection of the heat of fusion of a fusible, thermally conductive material within which the stator coils are packed, to the stator core. When high output torque is required from the motor, and therefore high electrical currents are applied to the stator coils, the coils heat up causing the thermally conductive material to melt. The material, being disposed between the coils and the inner walls of stator core slots within which the coils are received, resolidifies at the slot walls, thereby rejecting the heat of fusion of the material to the core which functions as a high capacity heat sink. An annular seal disposed about the inner periphery of the stator retains the thermally conductive material therewithin. Insulative slot liners may be employed in the core slots and may be apertured to accommodate flow of fused material therethrough.

BRIEF DESCRIPTION OF DRAWING

The sole FIGURE is a sectioned elevation of an electric motor incorporating the present invention.

BEST MODE FOR CARRYING OUT THE INVENTION AND INDUSTRIAL APPLICABILITY THEREOF

Referring to the Drawing, an electric motor 10 comprises a housing 15 within which is disposed, an annular stator core 20 formed from laminations 25 of ferromagnetic material. The core is provided with a plurality of slots 30 which receive coil windings 40 therewithin, the coil windings being formed typically from copper. Slot liners 45 may be provided to insulate the coils from the inner walls of core slots 30.

Stator core 20 receives therewithin, a rotor 47 of any known construction such as the rare earth, permanent magnetic rotor described hereinabove. As is well known in the art, rotor 47 is mounted on suitable bearings (not shown) and rotates in response to an electromagnetic field induced within the interior of the stator by the energization of coil windings 40.

As set forth hereinabove, in applications where high output torque and hence, high electrical input to coil 40 is required, or, where the motor is used in a close environment such as in a missile wherein ventilation of the motor to remove heat therefrom is unfeasible, the torque output available from the motor is limited by the motor's ability to cool itself. In accordance with the present invention, such cooling is achieved by the stator coils being packed within a thermally conductive, fusible material 50. Again referring to the drawing, this material is disposed within the voids between the inner walls of the slots and the coil windings. It will be understood that the ends of the windings, while not shown, will also be packed in the fusible, thermally conductive material.

The thermally conductive material may comprise any of various known greases, waxes or other semisolid materials which melt when heated by coil energization and resolidify where contacted with the cooler stator core. The material is radially retained by thin annular seal 55 attached to the inner surface of the stator core by any known technique such as welding or the like.

Heat from the stator is removed by melting and resolidification of the material. When the windings are energized with a high electrical input, the thermally conductive material melts, thereby absorbing heat from the windings. That portion of the thermally conductive material in contact with the walls of the stator slots solidifies thereon, the stator functioning as a high capacity heat sink to which the heat of fusion of the thermally conductive material is rejected. As more and more heat is rejected to the stator, more and more of the thermally conductive compound resolidifies for repeated melting. In this regard, it will be appreciated that the slot liners may be, but are not necessarily perforated to accommodate the fused, thermally conductive material therewithin.

Accordingly, it will be appreciated that the thermally conductive material within which the coils are packed provides an effective vehicle for the dissipation of heat from the stator coils into the core when other cooling techniques such as forced ventilation are inappropriate or unavailable. Since the fusible, thermally conductive material is received within the interior of the stator, it is ideally suited for heat dissipation in such environments as cruise missiles and the like wherein there is little, if any, free space for, the rejection of heat by convection. The enhanced coil cooling offered by the present invention allows motors such as rare earth, permanent magnet brushless d.c. motors to be operated at higher electrical inputs and therefore higher torque outputs then was hereinbefore feasible.

While a particular embodiment of the present invention has been shown and described, it will be understood that various modifications may be made without departing from the present invention. For example, while a brushless d.c. motor having a rotor with rare earth permanent magnets has been discussed, it will be understood that the invention herein may be useful wherever heat dissipation within an electric motor or similar actuator is involved. While the fusible, thermally conductive material, has been described as a wax or grease, it will be appreciated that the exact composition of the compound will depend on such factors as the amount of heat input thereto from the stator coils, chemical compatibility with surrounding motor structural materials, the temperature of fusion of the material, and other related factors. Accordingly, various other compounds may be employed without departing from this invention. It is intended by the following claims to cover these and any other modifications which may fall within the true spirit and scope of the present invention.

We claim:

1. In an electric motor having a stator and a rotor disposed within said stator for rotary movement with respect thereto, said stator comprising a core accommodating coils of electrically conductive material therewithin, the improvement characterized by:
   said coils being packed in a fusible, thermally conductive material, said thermally conductive material being fusible by heat induced within said coils in response to the energization thereof and solidifiable when cooled by the conduction of heat therefrom into said stator core, thereby rejecting the heat of fusion of said material into said stator core for enhancing the cooling, as well as the electrical input and torque output capabilities of said motor.

2. The motor of claim 1 characterized by said motor comprising a brushless d.c. motor having rare earth magnets disposed in said rotor thereof.

3. The motor of claim 1 characterized by said thermally conductive material comprising a wax.

4. The motor of claim 1 characterized by said thermally conductive material comprising a grease.

5. The motor of claim 1 characterized by an annular seal disposed about the inner periphery of said stator for the radial retention of said thermally conductive material therewithin.

6. The motor of claim 1 characterized by said stator being provided with a plurality of slots which accommodate said coils therewithin, said slots further accommodating slot liners therewithin, for insulating said coils from said stator core.

7. The motor of claim 6 characterized by said slot liners being perforated.

* * * * *